(12) United States Patent
Tomita et al.

(10) Patent No.: US 10,187,604 B2
(45) Date of Patent: Jan. 22, 2019

(54) DISPLAY APPARATUS, TERMINAL APPARATUS, AND DISPLAY SYSTEM

(71) Applicant: SEIKO EPSON CORPORATION, Tokyo (JP)

(72) Inventors: Kenichiro Tomita, Matsumoto (JP); Takeshi Yoshii, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 15/555,061

(22) PCT Filed: Feb. 1, 2016

(86) PCT No.: PCT/JP2016/000495
§ 371 (c)(1),
(2) Date: Aug. 31, 2017

(87) PCT Pub. No.: WO2016/139887
PCT Pub. Date: Sep. 9, 2016

(65) Prior Publication Data
US 2018/0048847 A1 Feb. 15, 2018

(30) Foreign Application Priority Data
Mar. 5, 2015 (JP) .................. 2015-043269

(51) Int. Cl.
*H04N 5/63* (2006.01)
*G03B 21/00* (2006.01)
(Continued)

(52) U.S. Cl.
CPC .............. *H04N 5/63* (2013.01); *G03B 21/00* (2013.01); *G03B 21/14* (2013.01); *G06F 1/32* (2013.01);
(Continued)

(58) Field of Classification Search
CPC ..................................................... G06F 1/3203
(Continued)

(56) References Cited

U.S. PATENT DOCUMENTS 7,607,014 B2 * 10/2009 Larson .................... G06F 21/35
713/154
9,647,728 B2 * 5/2017 Okamura ............. H04B 5/0062
(Continued)

FOREIGN PATENT DOCUMENTS

JP 2004-056554 A 2/2004
JP 2008-040367 A 2/2008
(Continued)

OTHER PUBLICATIONS

May 10, 2016 International Search Report issued in International Patent Application No. PCT/JP2016/000495.
(Continued)

*Primary Examiner* — Paulos M Natnael
(74) *Attorney, Agent, or Firm* — Oliff PLC

(57) ABSTRACT

A display apparatus includes a display unit configured to display an image, a wireless tag, a wireless communication unit configured to wirelessly communicate with an external terminal apparatus, and a control unit configured to switch an operation state of the display apparatus to at least a normal operation state and a power saving state. When detecting that the wireless tag communicates with the terminal apparatus in the power saving state, the control unit shifts the operation state to the normal operation state. The wireless communication unit returns from the power saving state to the normal operation state and establishes a wireless communication with the terminal apparatus.

12 Claims, 8 Drawing Sheets

(51) Int. Cl.
*G03B 21/14* (2006.01)
*G06F 1/32* (2006.01)
*G09G 5/00* (2006.01)
*G09G 3/02* (2006.01)
*H04N 5/44* (2011.01)
*H04W 76/10* (2018.01)
*H04W 52/02* (2009.01)

(52) U.S. Cl.
CPC ............. *G09G 3/02* (2013.01); *G09G 5/00* (2013.01); *H04N 5/4403* (2013.01); *H04N 2005/4426* (2013.01); *H04W 52/0225* (2013.01); *H04W 76/10* (2018.02)

(58) Field of Classification Search
USPC ..................... 348/730; 340/10.51, 5.6
See application file for complete search history.

(56) References Cited

U.S. PATENT DOCUMENTS

| | | |
|---|---|---|
| 2010/0068997 A1 | 3/2010 | Dunko |
| 2014/0006827 A1* | 1/2014 | Seto ............... G06F 1/3234 713/323 |
| 2014/0266578 A1* | 9/2014 | Yasukawa ............ G05B 9/02 340/5.6 |
| 2015/0049206 A1 | 2/2015 | Eshita |
| 2015/0165316 A1* | 6/2015 | Barney ............... A63F 13/06 463/39 |
| 2015/0271712 A1* | 9/2015 | Okamura ........... H04B 5/0062 340/10.51 |
| 2016/0259609 A1* | 9/2016 | Tomita ................ G06F 3/14 |

FOREIGN PATENT DOCUMENTS

| | | |
|---|---|---|
| JP | 2012-502554 A | 1/2012 |
| JP | 5527492 B1 | 6/2014 |
| JP | 2016-163293 A | 9/2016 |

OTHER PUBLICATIONS

Sep. 20, 2018 Search Report issued in European Patent Application No. 16758588.4.

* cited by examiner

32

| APPLICATION EXECUTED DURING NFC READING | APPLICATION PROGRAM (1) |

| MODEL | DATA | EXECUTED APPLICATION |
|---|---|---|
| MODEL 1-A | GROUP 1 | APPLICATION PROGRAM (1) |
| MODEL 1-B | GROUP 1 | |
| MODEL 2-A | GROUP 1 | |
| MODEL 2-B | GROUP 2 | APPLICATION PROGRAM (2) |
| MODEL 2-C | GROUP 1 GROUP 2 | |

FIG. 3B

DISPLAY APPARATUS, TERMINAL APPARATUS, AND DISPLAY SYSTEM

TECHNICAL FIELD

The present invention relates to a display apparatus, a terminal apparatus, and a display system.

BACKGROUND ART

There has been a method of operating a display apparatus such as a projector with a remote controller separated from the display apparatus (see, for example, PTL 1). In PTL 1, the remote controller transmits an infrared signal and the projector receives the infrared signal and runs.

Incidentally, as an apparatus for operating the display apparatus, it is conceivable to use an apparatus including, for example, a wireless communication function other than a remote controller that transmits the infrared signal. When an apparatus starts wireless communication with another one or others, those apparatuses have to have common information to establish the wireless communication in advance. Therefore, the display apparatus and the apparatus for controlling the display apparatus also need to exchange the information as well.

It has been proposed a method that apparatuses exchange information to establish wireless communication by a wireless tag which is readable wirelessly (see, for example, PTL 2). In the configuration described in PTL 2, a wireless communication apparatus reads an NFC (Near Field Communication) tag, which is a type of a wireless tag, to thereby acquire service provider information and the like of a WLAN (Wireless Local Area Network).

CITATION LIST

Patent Literature

PTL 1: JP-A-2008-40367
PTL 2: JP-T-2012-502554

SUMMARY OF INVENTION

Technical Problem

In the configuration described in PTL 2, the display apparatus has to be in a wirelessly communicable state in order to establish wireless communication between the display apparatus and the apparatus for operating the display apparatus. Therefore, for example, operation for turning on a power supply of the display apparatus is required before the NFC tag is read. There is a problem in that operation is complicated. The operation could be simplified if the wireless communication function were turned on while the display apparatus stays on standby. However, there is a problem in that power consumption during the standby increases.

The present invention has been devised in view of the circumstances and an object of the present invention is to, with a configuration that can suppress power consumption during standby and simplify operation, make it possible to operate a display apparatus using an apparatus that wirelessly communicates with the display apparatus.

Solution to Problem

In order to achieve the object, the present invention provides a display apparatus including: a display unit configured to display an image; a wireless tag; a wireless communication unit configured to wirelessly communicate with an external terminal apparatus; and a control unit configured to switch an operation state of the display apparatus to at least a normal operation state and a power saving state. When detecting that the wireless tag communicates with the terminal apparatus in the power saving state, the control unit shifts the operation state to the normal operation state. The wireless communication unit returns from the power saving state to the normal operation state and establishes a wireless communication with the terminal apparatus.

According to the present invention, when the display apparatus is in the power saving state, it is possible to quickly start the wireless communication between the display apparatus and the external terminal apparatus by operation to read the wireless tag. Therefore, it is possible to reduce the power consumption of the display apparatus while the wireless communication is not established and start the wireless communication between the display apparatus and the terminal apparatus without any complicated operations.

In the present invention, in the display apparatus, the wireless tag may retain at least wireless communication setting information related to the wireless communication of the wireless communication unit, and the wireless communication unit may establish the wireless communication with the terminal apparatus using the wireless communication setting information retained by the wireless tag.

According to the present invention, it is possible to quickly establish the wireless communication on the basis of the information of the wireless tag.

In the present invention, in the display apparatus, the wireless tag may be an NFC tag and include identification information to identify a type of the display apparatus.

According to the present invention, the external terminal apparatus that reads the wireless tag can identify a model of the display apparatus on the basis of the information of the wireless tag. Therefore, for example, the terminal apparatus is capable of performing control corresponding to a difference in specifications due to the model of the display apparatus. It is possible to achieve improvement of convenience.

In the present invention, in the display apparatus, the control unit may enable power supply to the wireless communication unit and the display unit in the normal operation state and turn off the power supply to the wireless communication unit and the display unit and stand by for communication of the wireless tag in the power saving state.

According to the present invention, it is possible to reduce power consumption in a state in which the control unit stands by for the communication of the wireless tag.

In the present invention, in the display apparatus, the control unit may shift from the power saving state to the normal operation state, start the power supply to the wireless communication unit, and, thereafter, when a state in which the wireless communication unit does not establish the wireless communication with the terminal apparatus continues, shift to the power saving state again.

According to the present invention, it is possible to reduce power consumption when the wireless communication is not established.

In the present invention, the display apparatus may further include an infrared communication unit configured to receive infrared signals, and the control unit may enable receiving infrared signals from the infrared communication unit in the power saving state.

According to the present invention, it is possible to receive not only the communication by the wireless tag but also infrared signals in the power saving state.

A terminal apparatus of the present invention includes: a tag communication unit configured to read a wireless tag; an inter-apparatus wireless communication unit configured to wirelessly communicate with an external apparatus; a storing unit configured to store application programs; and a terminal control unit configured to establish a wireless communication with the external apparatus through the inter-apparatus wireless communication unit on the basis of the information read from the wireless tag by the tag communication unit, read out, from the storing unit, an application program corresponding to the information read from the wireless tag and execute the application program, and transmit, from the inter-apparatus wireless communication unit, control information for controlling the external apparatus.

According to the present invention, it is possible to establish the wireless communication with the external apparatus such as a display apparatus with simple operation to read the wireless tag and thereafter control the external apparatus according to a function of the application program.

In the present invention, the terminal apparatus may further include: a display unit configured to display a screen; and an operation unit configured to receive operation, and the terminal control unit may display, according to a function of the application program, with the display unit, an operation screen for controlling the external apparatus and transmit the control information on the basis of operation detected by the operation unit during the display of the operation screen.

According to the present invention, it is possible to easily operate the external apparatus using the operation screen.

In the present invention, in the terminal apparatus, the terminal control unit may be capable of executing a plurality of the application programs for displaying, on the display unit, the operation screens different from one another and select, on the basis of the information read from the wireless tag by the tag communication unit, the application program to be executed.

According to the present invention, it is possible to select and execute an application program suitable to the external apparatus on the basis of the information read by the wireless tag. Therefore, it is possible to, for example, configure the terminal apparatus to be capable of reading wireless tags of a plurality of kinds of external apparatuses and execute application programs suitable to the respective external apparatuses.

In the present invention, in the terminal apparatus, the terminal control unit may display, on the display unit, the operation screen corresponding to the information read from the wireless tag by the tag communication unit among a plurality of the operation screens displayable by the function of the application program.

According to the present invention, it is possible to display an operation screen suitable to the external apparatus on the basis of the information read by the wireless tag. Therefore, it is possible to, for example, configure the terminal apparatus to be capable of reading wireless tags of a plurality of kinds of external apparatuses and display operation screens suitable to the respective external apparatuses.

In the present invention, in the terminal apparatus, the terminal control unit may execute a first application program when the wireless tag is read by the tag communication unit and execute, according to a function of the first application program, a second application program corresponding to the information read from the wireless tag.

According to the present invention, it is possible to start an application program on the basis of the information read by the wireless tag and execute an application program suitable to the external apparatus according to a function of the application program. Therefore, a function of selecting and starting an application program corresponding to the external apparatus can be implemented as an application program. Therefore, a function of associating the wireless tag and the application program can be further enhanced by a function of the application program.

A display system of the present invention includes: a display apparatus; and a terminal apparatus. The display apparatus includes: a display unit configured to display an image; a wireless tag; a wireless communication unit configured to wirelessly communicate with the terminal apparatus; and a control unit configured to switch an operation state of the display apparatus to at least a normal operation state and a power saving state. When detecting that the wireless tag communicates with the terminal apparatus in the power saving state, the control unit shifts the operation state to the normal operation state. The wireless communication unit returns from the power saving state to the normal operation state and establishes a wireless communication with the terminal apparatus. The terminal apparatus includes: a tag communication unit configured to read the wireless tag of the display apparatus; an inter-apparatus wireless communication unit configured to wirelessly communicate with the display apparatus; a storing unit configured to store application programs; and a terminal control unit configured to establish the wireless communication with the display apparatus through the inter-apparatus wireless communication unit on the basis of the information read from the wireless tag by the tag communication unit, read out, from the storing unit, an application program corresponding to the information read from the wireless tag and execute the application program, and transmit, from the inter-apparatus wireless communication unit, control information for controlling the display apparatus.

According to the present invention, in the system including the display apparatus and the terminal apparatus, when the display apparatus is in the power saving state, it is possible to quickly start the wireless communication between the terminal apparatus and the display apparatus. Therefore, it is possible to reduce power consumption of the display apparatus while wireless communication is not established and start the wireless communication between the display apparatus and the terminal apparatus without performing complicated operation.

BRIEF DESCRIPTION OF THE DRAWINGS

FIG. 3 is a diagram showing a configuration example of NFC setting data.

DESCRIPTION OF EMBODIMENTS

An embodiment of the present invention is explained below with reference to the accompanying drawings.

Figure 1:
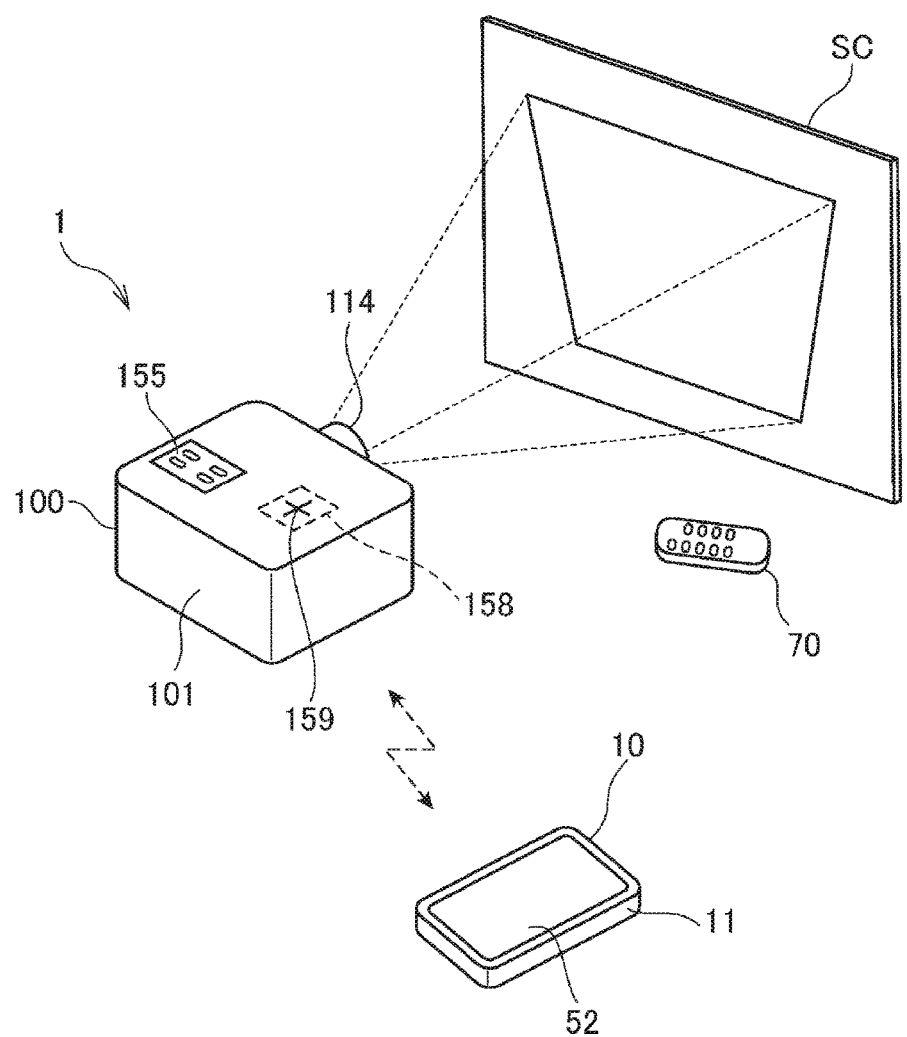
FIG. 1 is a diagram showing a schematic configuration of a display system.

A schematic configuration of a display system 1 in this embodiment is shown in FIG. 1. The display system 1 in this embodiment includes a terminal apparatus 10 functioning as an input apparatus and a projector 100 functioning as a display apparatus.

The terminal apparatus 10 is a small apparatus that a user holds and operates and is, for example, a portable apparatus such as a cellular phone such as a smartphone, a tablet terminal, or a PDA (Personal Digital Assistants). The terminal apparatus 10 includes a flat terminal apparatus main body 11. A display panel 52 (a display screen) is disposed on the surface of the terminal apparatus main body 11. A touch screen 53 (FIG. 2) for detecting contact operation by the user is disposed on the surface of the display panel 52. As shown in FIG. 1, the display panel 52 is disposed to cover substantially the entire surface of one of widest surfaces of the terminal apparatus main body 11. The display panel 52 in this embodiment has an elongated rectangular shape. The user can clearly distinguish a long side and a short side. The terminal apparatus 10 may include various switches as other input devices of the touch screen 53.

The projector 100 projects image light on a projection target and forms an image on a surface of the projection target. The projection target on which the projector 100 projects an image may be a plane or may be a curved surface or an uneven surface. However, in this embodiment, an example is explained in which the projector 100 projects an image on a screen SC configured by a plane. A fixed plane such as a wall surface may be used as the screen SC. The screen SC may be a suspended or erected curtain-like screen. FIG. 1 shows a setting state of the projector 100. The projector 100 includes a box-shaped projector main body 101. A projection opening section 114 for projecting image light is provided on one surface of the projector main body 101. The projection opening section 114 is an opening section from which a projection optical system 113 (FIG. 4) incorporated in the projector main body 101 irradiates light. An operation panel 155 is disposed on the upper surface of the projector main body 101. The operation panel 155 includes switches for operating the projector 100 and indicator lamps indicating an operation state of the projector 100. For example, the operation panel 155 includes a power switch for switching the operation state of the projector 100 to a normal operation state and a standby state (a power saving state).

The projector 100 can be operated by a remote controller 70 that transmits an infrared signal. The remote controller 70 may be an apparatus configuring the display system 1 or may be not included in the display system 1. The remote controller 70 includes various switches for operating the projector 100 and transmits a signal corresponding to operation of the switch to the projector 100 as an infrared signal.

The projector 100 includes an NFC (Near Field Communication) tag 158. The NFC tag 158 (a wireless tag) is an information storage medium called RFID (Radio Frequency Identifier) tag or wireless tag. The NFC tag 158 stores various kinds of information in a ROM (Read Only Memory) incorporated therein. The information stored by the NFC tag 158 can be read from the outside. The NFC tag 158 may be an active tag that receives power supply from the inside of the projector 100 or may be a passive tag that receives power supply from an apparatus that reads the NFC tag 158. In this embodiment, an example is explained in which the NFC tag 158 is configured as the passive tag.

The NFC tag 158 is a tag conforming to a standard of NFC formulated as an ISO standard. However, an RFID tag of another type such as Felica (registered trademark) may be used. As the RFID tag, there are a tag that uses a radio signal in a 125 kHz band, a tag that uses a radio signal in a 13.56 MHz band, a tag that uses a radio signal in a UHF band (a 950 MHz band), a tag that uses a radio signal in a 2.45 GHz band, and the like. All of the tags can be used as the NFC tag 158. Note that, in this embodiment, an example is explained in which the NFC tag 158 is configured as a tag that is mounted on a smartphone and the like in many cases and uses a radio signal in the 13.56 MHz band.

The NFC tag 158 is set on the rear side of the upper surface exterior of the projector main body 101 or near the upper surface of the projector main body 101 on the inside of the projector main body 101. Therefore, when an apparatus having an NFC reading function approaches the upper surface of the projector main body 101, the apparatus can read the NFC tag 158. A marker 159 indicating a position near the NFC tag 158 is drawn on the upper surface of the projector main body 101. The marker 159 serves as a reference in reading the NFC tag 158.

In this embodiment, the screen SC has a rectangular shape. The projector 100 is disposed on the front (the front surface) side of the screen SC. The projector 100 projects image light of a rectangular image (including a still image and a moving image). A rectangular projected image is formed on the screen SC. In the setting state shown in FIG. 1, the projector 100 projects the image light upward from an oblique lower part of the screen SC. Therefore, a projected image formed on the screen SC is not rectangular. Trapezoidal distortion occurs in the projected image.

The terminal apparatus 10 and the projector 100 are connected to be capable of transmitting and receiving various data according to a wireless communication scheme. The wireless communication scheme is a short range wireless communication scheme such as a wireless LAN (Local Area Network) conforming to the IEEE802.11 standard, Bluetooth (registered trademark), or UWB (Ultra Wide Band). A wireless communication scheme that makes use of a cellular phone line may be adopted.

In this embodiment, a configuration is illustrated in which the terminal apparatus 10 and the projector 100 are connected by a wireless LAN and control data and content data explained below are transmitted and received by radio.

The terminal apparatus 10 with which the projector 100 communicates is not limited to one terminal apparatus. In FIG. 1, as an example, the display system 1 including one projector 100 and one terminal apparatus 10 is shown.

When establishing wireless communication, the terminal apparatus 10 and the projector 100 identify each other using information such as a MAC (Media Access Control) address, an SSID (Service Set IDentifier), an access point name, and a passphrase (a password) and are connected. These kinds of information are referred to as wireless communication setting information. In this embodiment, in a state in which the terminal apparatus 10 and the projector 100 are capable of performing wireless communication, the terminal apparatus 10 searches for, on the basis of the wireless communication setting information, the projector 100 present in a range in which wireless communication is possible. Therefore, the terminal apparatus 10 needs to have the wireless communication setting information of the projector 100 in advance.

In the display system 1, the wireless communication setting information of the projector 100 is stored in the NFC tag 158. Therefore, the terminal apparatus 10 can obtain the wireless communication setting information for wireless connection to the projector 100 by reading the NFC tag 158. If the terminal apparatus 10 and the projector 100 establish wireless communication using the wireless communication setting information, thereafter, by transmitting a radio signal to the projector 100, the terminal apparatus 10 can operate the projector 100 as if the remote controller 70 is used.

Figure 2:
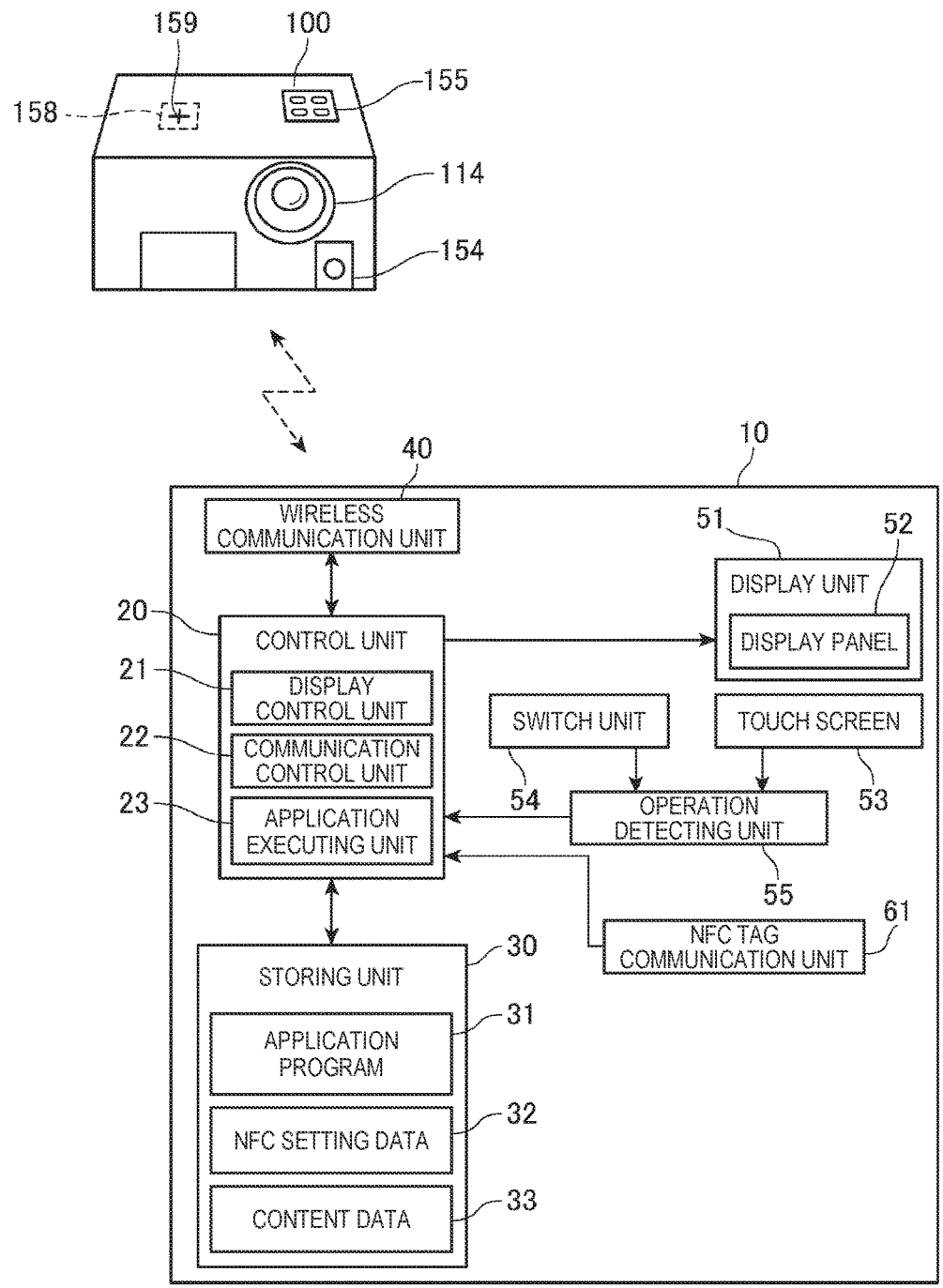
FIG. 2 is a block diagram showing the configuration of a terminal apparatus.

FIG. 2 is a block diagram showing the configuration of the terminal apparatus 10.

The terminal apparatus 10 includes a control unit 20 (a terminal control unit) that controls the units of the terminal apparatus 10. The control unit 20 includes a CPU (Central Processing Unit), a ROM, a DRAM (Dynamic Random Access Memory), and the like not shown in the figure. The control unit 20 reads a basic control program stored in the ROM into the DRAM and executes the basic control program with the CPU to control the terminal apparatus 10. The control unit 20 executes programs stored in a storing unit 30 to thereby function as a display control unit 21, a communication control unit 22, and an application executing unit 23 explained below (these units are hereinafter referred to as functional blocks).

The terminal apparatus 10 includes the storing unit 30. The storing unit 30 is a nonvolatile storage device such as a flash memory or an EEPROM (Electrically Erasable and Programmable Read Only Memory) and is connected to the control unit 20. The storing unit 30 stores various programs executed by the control unit 20 and data. The storing unit 30 stores an application program 31, NFC setting data 32, and content data 33.

The terminal apparatus 10 includes a wireless communication unit 40 (an inter-apparatus wireless communication unit). The wireless communication unit 40 includes an antenna and an RF (Radio Frequency) circuit (not shown in the figure) and is connected to the control unit 20. The wireless communication unit 40 is controlled by the control unit 20. The wireless communication unit 40 transmits and receives various data to and from the projector 100 according to the wireless communication scheme explained above. The wireless communication unit 40 functions as a transmitting unit together with the communication control unit 22.

The terminal apparatus 10 includes a display unit 51. The display unit 51 includes a display panel 52 and is connected to the control unit 20. The display unit 51 draws, on the basis of image data input from the control unit 20, a frame image adjusted to display resolution of the display panel 52 in a drawing region secured in a not-shown DRAM to thereby cause the display panel 52 to display an image.

The terminal apparatus 10 includes the touch screen 53, a switch unit 54, and an operation detecting unit 55. The touch screen 53 detects touch operation on the display panel 52 and outputs a position signal indicating a detected operation position to the operation detecting unit 55. The operation detecting unit 55 generates, on the basis of the position signal input from the touch screen 53, coordinate information indicating a coordinate on the touch screen 53 and outputs the coordinate information to the control unit 20.

The switch unit 54 includes operators such as switches provided separately from the touch screen 53. When the switches are operated, the switch unit 54 outputs an operation signal to the operation detecting unit 55. The operation detecting unit 55 generates, on the basis of the operation signal input from the switch unit 54, operation information corresponding to the operated operator and outputs the operation information to the control unit 20. The touch screen 53 and the switch unit 54 are equivalent to the operation unit.

The control unit 20 can detect, on the basis of the coordinate information or the operation information input from the operation detecting unit 55, contact operation on the display panel 52, operation of the operators including the switches, and operation for moving the main body of the terminal apparatus 10.

The terminal apparatus 10 includes an NFC tag communication unit 61 (a tag communication unit). The NFC tag communication unit 61 is a tag reader that reads an NFC tag conforming to the NFC standard and outputs data read from the NFC tag to the control unit 20. The NFC tag communication unit 61 is capable of reading at least a passive tag. In a state in which the terminal apparatus 10 is operating and a reading operation of the NFC tag communication unit 61 is effective, the NFC tag 158 sends a radio signal for reading at every predetermined time. When induced power is generated in the NFC tag by the radio signal and the NFC tag transmits a radio signal, the NFC tag communication unit 61 receives the radio signal of the NFC tag, decodes the radio signal, and outputs received data to the control unit 20. The NFC tag communication unit 61 may be a reader/writer apparatus capable of performing writing in the NFC tag in addition to reading of data from the NFC tag.

The control unit 20 executes a basic control program stored in the storing unit 30 and performs basic control of the units of the terminal apparatus 10. The control is equivalent to an operating system of the terminal apparatus 10. The display control unit 21, the communication control unit 22, and the application executing unit 23 provide basic services to application programs running on the operating system.

The display control unit 21 controls the display unit 51 and causes the display panel 52 to display various screens. The display control unit 21 reads out image data and the like stored in the storing unit 30 and outputs the image data and the like to the display unit 51. The display unit 51 draws, on the basis of the input image data, a frame adjusted to display resolution of the display panel 52 in a drawing region secured in a not-shown DRAM and drives the display panel 52 on the basis of the drawn frame.

The communication control unit 22 controls the wireless communication unit 40 to perform wireless communication with the projector 100. The communication control unit 22 executes transmission and reception of a wireless signal at a predetermined frequency and performs encoding of data to be transmitted and decoding of received data.

The application executing unit 23 executes the application program 31 stored by the storing unit 30.

The storing unit 30 can store a plurality of application programs 31. Start conditions are set for the respective application programs 31. For example, when operation is performed on an icon displayed on the display panel 52, the application program 31 associated with the operated icon is executed by the application executing unit 23. The application executing unit 23 selects and executes the application program 31 corresponding to operation of the touch screen 53, operation of the switch unit 54, or data read from the NFC tag by the NFC tag communication unit 61.

The NFC setting data 32 decides the application program 31 started when the NFC tag communication unit 61 reads data from the NFC tag. The application executing unit 23 refers to the data read by the NFC tag communication unit 61 and the NFC setting data 32 and selects and executes the application program 31 corresponding to the read data.

A specific configuration example of the NFC setting data 32 is shown in FIG. 3.

FIG. 3(A) is a schematic diagram showing a first configuration example of the NFC setting data 32. FIG. 3(B) is a schematic diagram showing a second configuration example of the NFC setting data 32.

The first configuration example shown in FIG. 3(A) is a simplest configuration of the NFC setting data 32. The NFC setting data 32 decides one application program 31 started when the NFC tag communication unit 61 reads data from the NFC tag. In the example shown in the figure, an application program (1) is registered as an application program to be executed.

In this case, when interruption indicating the reading of the data is performed on the control unit 20 from the NFC tag communication unit 61, the application executing unit 23 executes one application program 31 (the application program (1)) designated by the NFC setting data 32.

The NFC setting data 32 of the second configuration example shown in FIG. 3(B) associates content of data read from the NFC tag by the NFC tag communication unit 61 with each of the plurality of application programs 31.

For example, when data readably retained by the NFC tag 158 includes data serving as a clue for classifying a model of the projector 100, the application program 31 to be executed can be selected in association with the model. In the example shown in FIG. 3(B), the application executing unit 23 selects a more suitable application program 31 on the basis of the data serving as the clue for classifying the model of the projector 100 read from the NFC tag 158 by the NFC tag communication unit 61. As selection conditions, for example, the application program (1) is selected when the data of the NFC tag 158 has a "group 1" and does not have a "group 2" and an application program (2) is selected when the data of the NFC tag 158 has the "group 2". As shown in FIG. 3(B), it is assumed that the NFC tag 158 of models "1-A", "1-B", and "2-A" of the projector 100 has only the data of the "group 1", the NFC tag 158 of a model "2-B" of the projector 100 has only the data of the "group 2", and the NFC tag 158 of a model "2-C" of the projector 100 has the data of the "group 1" and the "group 2". In this case, when the model of the projector 100 is "1-A", "1-B", or "2-A", the application program (1) is selected. When the model of the projector 100 is "2-B" or "2-C", the application program (2) is selected. In this way, the selection conditions for the application program (1) and the application program (2) are associated with the data stored in the NFC tag 158. Consequently, the application executing unit 23 can execute the application program 31 corresponding to the model. By adopting this method, even if a name itself of an application program is not stored in the NFC tag, the application program to be executed can be selected according to data representing characteristics of the model of the projector 100. Therefore, it is possible to more flexibly select an optimum application program.

The content data 33 includes moving image (video) data and still image data and is data of contents reproducible by the projector 100. The content data 33 may include a plurality of moving image or still image data or may include sound data. When content data is transmitted by a function of the application program 31 executed by the application executing unit 23, the application program 31 reads out the content data 33 and transmits the content data 33 with the wireless communication unit 40.

Figure 4:
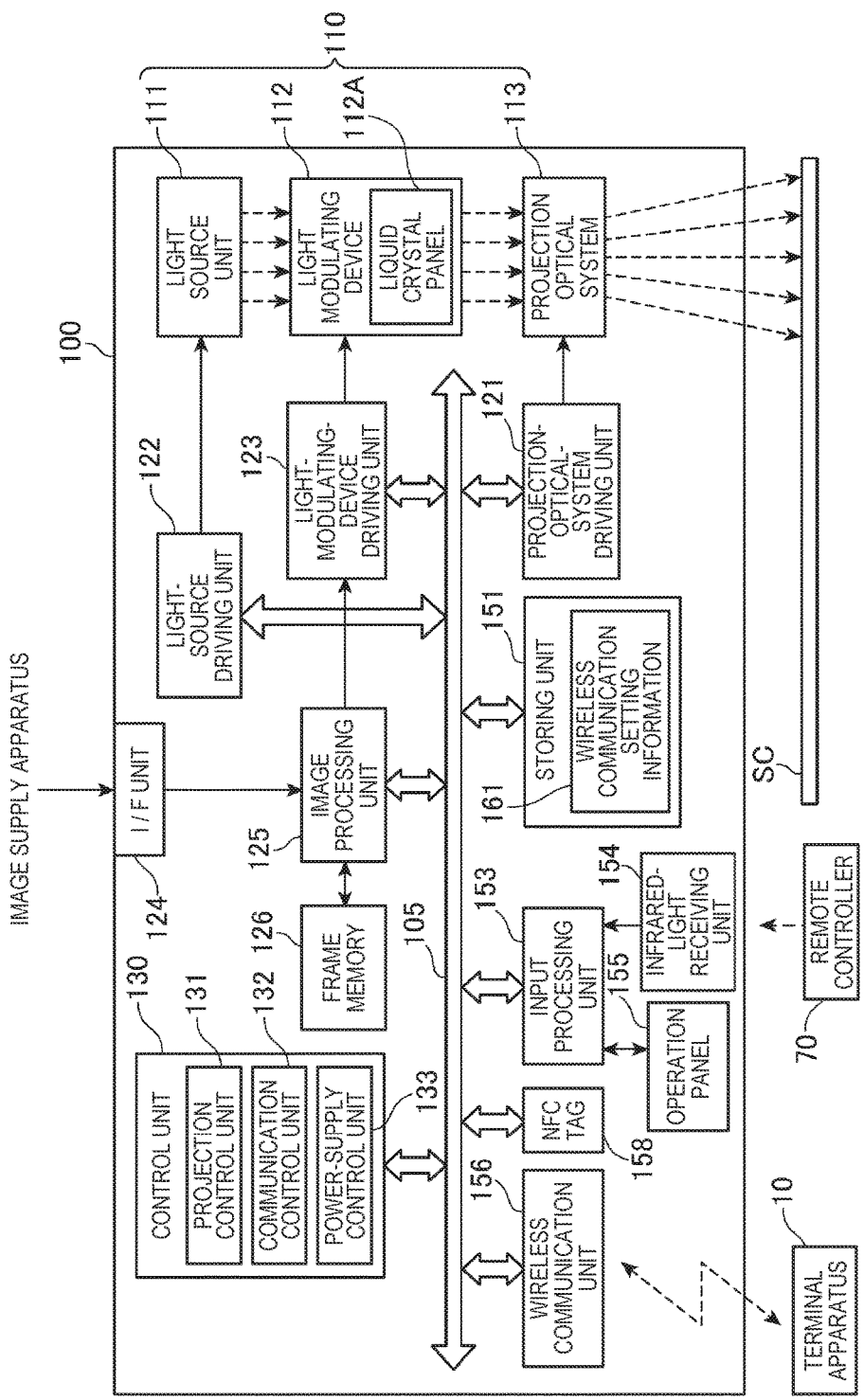
FIG. 4 is a block diagram showing an example of the configuration of a projector.

FIG. 4 is a block diagram showing the configuration of the projector 100.

The projector 100 includes an interface unit (hereinafter abbreviated as I/F) 124. The projector 100 is connected to an image supply apparatus via the I/F unit 124. As the I/F unit 124, for example, a DVI interface to which a digital video signal is input, a USB interface, and a LAN interface can be used. As the I/F unit 124, for example, an S video terminal to which a composite video signal such as NTSC, PAL, or SECAM is input, an RCA terminal to which a composite video signal is input, and a D terminal to which a component video signal is input can be used. Further, as the I/F unit 124, a general-purpose interface such as an HDMI connector conforming to an HDMI (registered trademark) standard can be used. The I/F unit 124 may include an A/D conversion circuit that converts an analog video signal into digital image data and may be connected to the image supply apparatus by an analog video terminal such as a VGA terminal. Note that the I/F unit 124 may perform transmission and reception of an image signal through wired communication and may perform transmission and reception of an image signal through wireless communication.

The projector 100 roughly includes a projecting unit 110 (a display unit) that performs formation of an optical image and an image processing system that electrically processes an image signal input to the projecting unit 110. The projecting unit 110 includes a light source unit 111, a light modulating device 112 including a liquid crystal panel 112A, and a projection optical system 113.

The light source unit 111 includes a light source such as a xenon lamp, an ultra-high pressure mercury lamp, an LED (Light Emitting Diode), or a laser. The light source unit 111 may include a reflector and an auxiliary reflector that guide light emitted by the light source to the light modulating device 112. The light source unit 111 may include a lens group (not shown in the figure) for improving an optical characteristic of projected light, a sheet polarizer, or a dimming element for reducing, on a path leading to the light modulating device 112, a light amount of the light emitted by the light source.

The light modulating device 112 includes, for example, a liquid crystal panel 112A of a transmission type. The liquid crystal panel 112A receives a signal from an image processing system explained below and forms an image. In this case, the light modulating device 112 includes three liquid crystal panels 112A corresponding to the three primary colors of RGB in order to perform color projection. Light from the light source unit 111 is separated into color lights of three colors of RGB. The color lights are made incident on the liquid crystal panels 112A corresponding to the color lights. The color lights passed through the liquid crystal panels 112A to be modulated are combined by a combination optical system such as a cross dichroic prism and emitted to the projection optical system 113.

Note that the light modulating device 112 is not limited to the configuration including the three liquid crystal panels 112A of the transmission type. For example, three liquid crystal panels of a reflection type can also be used. The light modulating device 112 can also be configured by, for example, a method of combining one liquid crystal panel and color wheels, a method of using three DMDs (Digital Mirror Devices), or a method of combining one DMD and color wheels. When only one liquid crystal panel 112A or DMD is used as the light modulating device 112, a member equivalent to the combination optical system such as the cross dichroic prism is unnecessary. Besides the liquid crystal panel 112A and the DMD, a component capable of modulating light emitted by the light source can also be adopted without a problem.

The projection optical system 113 irradiates the incident light modulated by the light modulating device 112 toward the outside from the projection opening section 114 (FIG. 1) using a projection lens and forms a projected image on the screen SC.

A projection-optical-system driving unit 121 that drives motors included in the projection optical system 113 according to the control by a control unit 130 and a light-source driving unit 122 that drives the light source included in the light source unit 111 according to the control by the control unit 130 are connected to the projecting unit 110. The projection-optical-system driving unit 121 and the light-source driving unit 122 are connected to a bus 105.

The projector 100 includes a wireless communication unit 156. The wireless communication unit 156 is connected to the bus 105. The wireless communication unit 156 includes an antenna and an RF (Radio Frequency) circuit not shown in the figure. The wireless communication unit 156 communicates with the terminal apparatus 10 according to a wireless communication standard under the control by the control unit 130. The projector 100 and the terminal apparatus 10 are connected to be capable of transmitting and receiving various data according to the wireless communication scheme.

The NFC tag 158 of the projector 100 is connected to the bus 105. When electric power is supplied by a radio signal for reading emitted by the terminal apparatus 10, the NFC tag 158 interrupts the control unit 130.

The image processing system included in the projector 100 is configured mainly from the control unit 130 that integrally controls the entire projector 100. Besides, the image processing system includes a storing unit 151, an image processing unit 125, a light-modulating-device driving unit 123, and an input processing unit 153. The control unit 130, the storing unit 151, the input processing unit 153, the image processing unit 125, and the light-modulating-device driving unit 123 are respectively connected to the bus 105.

The control unit 130 includes a CPU, a ROM, a RAM, and a DRAM not shown in the figure. The control unit 130 reads out a basic control program stored in the ROM to the RAM or the DRAM, executes the basic control program with the CPU, and controls the projector 100. The control unit 130 executes the application program 31 stored in the storing unit 151 to thereby function as a projection control unit 131, a communication control unit 132, and a power-supply control unit 133 explained below.

The storing unit 151 is a nonvolatile memory such as a flash memory or an EEPROM. The storing unit 151 stores a control program used for the control of the projector 100, image data, and the like.

The storing unit 151 stores wireless communication setting information 161. The wireless communication setting information 161 includes at least one of the wireless communication setting information stored by the NFC tag 158. The wireless communication setting information 161 may include the entire wireless communication setting information of the NFC tag 158. The wireless communication setting information stored by the NFC tag 158 may be copied to the storing unit 151 according to the control by the control unit 130.

The image processing unit 125 executes, for example, resolution conversion processing for converting image data input from the I/F unit 124 into data having resolution matching the specifications of the liquid crystal panel 112A of the light modulating device 112. The image processing unit 125 draws, in the frame memory 126, an image for display displayed by the light modulating device 112 and outputs the drawn image for display to the light-modulating-device driving unit 123. The light-modulating-device driving unit 123 drives the light modulating device 112 on the basis of the image for display input from the image processing unit 125. Consequently, an image is drawn on the liquid crystal panel 112A of the light modulating device 112. The drawn image is projected on the screen SC as a projected image via the projection optical system 113.

The image processing unit 125 executes correction processing for correcting trapezoidal distortion of the projected image by deforming the image drawn in the frame memory 126. In the correction processing, so-called barrel distortion (pin-cushion distortion) may be corrected. The image processing unit 125 may execute deformation processing such as enlargement, reduction, and rotation of the image.

In the projector 100, the operation panel 155 is disposed on the upper surface of the projector main body 101 (FIG. 1). The operation panel 155 is connected to the input processing unit 153. The input processing unit 153 appropriately lights or flashes the indicator lamps of the operation panel 155 according to the control by the control unit 130 and according to an operation state and a setting state of the projector 100. When the switch of the operation panel 155 is operated, an operation signal corresponding to the operated switch is output to the control unit 130 from the input processing unit 153.

The projector 100 includes an infrared-light receiving unit 154 (an infrared communication unit) that receives a signal from the remote controller 70 used by the user. For example, as shown in FIG. 2, the infrared-light receiving unit 154 is set on the front surface of the projector main body 101 and receives an infrared signal emitted by the remote controller 70. The infrared-light receiving unit 154 decodes the infrared signal received from the remote controller 70, generates an operation signal indicating operation content in the remote controller 70, and outputs the operation signal to the control unit 130.

Functional blocks included in the control unit 130 are explained.

The projection control unit 131 controls the image processing unit 125 to draw an image in the frame memory 126 on the basis of image data supplied from the image supply apparatus via the I/F unit 124. When the communication control unit 132 receives content data from the terminal apparatus 10, the projection control unit 131 controls the image processing unit 125 to draw an image in the frame memory 126 based on the content data. The projection control unit 131 controls the light-modulating-device driving unit 123 to draw the image drawn in the frame memory 126 on the liquid crystal panel 112A of the light modulating device 112. The image drawn on the liquid crystal panel 112A of the light modulating device 112 is projected on the screen SC as a projected image via the projection optical system 113.

The communication control unit 132 controls the wireless communication unit 40 to perform wireless communication with the terminal apparatus 10. The communication control unit 132 establishes wireless communication with the terminal apparatus 10, receives control data and content data transmitted by the terminal apparatus 10, and processes the received data. For example, when the communication control unit 132 receives content data, the content data is temporarily stored in the RAM of the control unit 130 or the storing unit 151 and projected on the screen SC by the projection control unit 131.

The power-supply control unit 133 switches the operation state of the projector 100 to the normal operation state and the standby state. In the normal operation state, the power-supply control unit 133 brings the components included in the projector 100 into at least a state in which projection by the projecting unit 110 is possible. That is, electric power is supplied to the units of the projecting unit 110 and the units configuring the image processing system. The normal operation state includes a state in which the light source of the light source unit 111 is extinguished or the luminance of the light source is reduced in a state in which there is no image projected by the projecting unit 110.

The standby state is at least a state in which the control unit 130, the input processing unit 153, and the infrared-light receiving unit 154 operate and operation of the power switch and an infrared signal from the remote controller 70 can be detected. It is possible to turn off power supply to the units of the projecting unit 110, the projection-optical-system driving unit 121, the light-source driving unit 122, the light-modulating-device driving unit 123, the image processing unit 125, and the frame memory 126 or bring the power supply into a low power state. It is possible to turn off power supply to the storing unit 151 and the wireless communication unit 156 or bring the power supply into a low power state. In this embodiment, the power supply to the wireless communication unit 156 is turned off in the standby state. Therefore, power consumption of the projector 100 in the standby state is low compared with the power consumption in the normal operation state.

Figure 5:
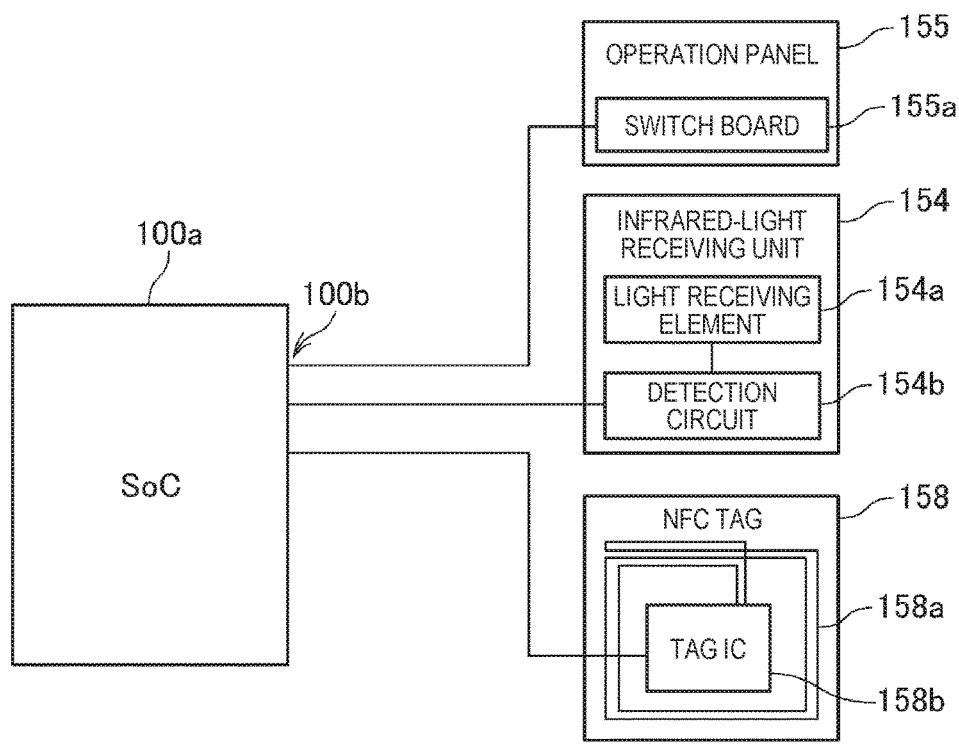
FIG. 5 is a diagram showing a specific configuration example of the projector.

In FIG. 5, a specific configuration example is shown concerning a main part of the control system of the projector 100.

An SoC (System on Chip) 100a shown in FIG. 5 is an integrated circuit in which a part of the functional blocks shown in FIG. 4 are integrated. At least the control unit 130 and the input processing unit 153 are implemented in the SoC 100a. The storing unit 151 may be included in the SoC 100a. The image processing unit 125 and the frame memory 126 may be implemented in the SoC 100a. Further, the projection-optical-system driving unit 121, the light-source driving unit 122, and the light-modulating-device driving unit 123 may be implemented. These units are implemented as, for example, an IP core of the SoC 100a.

In the standby state, the SoC 100a stops a part of a CPU core or keeps an operating frequency low to thereby change to a state in which power consumption is lower than the power consumption in the normal operation state. In the standby state, the SoC 100a is capable of detecting interruption from the infrared-light receiving unit 154, the operation panel 155, and the NFC tag 158 connected to an interruption terminal (a signal input terminal having a function of detecting an interruption signal) 100b.

In the standby state, when detecting an input of an interruption signal to the interruption terminal 100b, specifically, a change in the potential of the interruption terminal 100b, the SoC 100a returns to the normal operation state. The infrared-light receiving unit 154 includes, as shown in FIG. 5, a light receiving element 154a configured by a phototransistor or a photodiode and a detection circuit 154b that detects a light receiving state of the light receiving element 154a. The detection circuit 154b drives the light receiving element 154a. When a light reception pattern of infrared light detected by the light receiving element 154a matches a pattern of a transmission signal of the remote controller 70, the detection circuit 154b inputs an interruption signal to the interruption terminal 100b.

The operation panel 155 includes a switch board 155a connected to the various switches explained above. For example, a mechanical switch conducting according to operation of a switch can be implemented on the switch board 155a. The switch board 155a can be configured by a flat switch in which printed wires conduct one another. The switch board 155a is energized according to the operation of the switch to input an interruption signal to the interruption terminal 100b. Note that, concerning all the switches included in the operation panel 155, the switch board 155a does not have to output the interruption signal during operation. For example, in the standby state of the SoC 100a, the switch board 155a may be configured to input the interruption signal to the interruption terminal 100b when the power switch of the operation panel 155 is operated and not to input the interruption signal even if the other switches are operated.

The NFC tag 158 includes an antenna 158a and a tag IC 158b. An induced current flows to the antenna 158a according to a radio signal emitted by an apparatus (e.g., the terminal apparatus 10) that reads the NFC tag 158. The tag IC 158b starts using the induced current as a power supply. The tag IC 158b includes a ROM that stores wireless communication setting information and the like and a control unit that executes wireless communication by the antenna 158a. The tag IC 158b starts operation when the induced current of the antenna 158a flows, executes wireless communication with the terminal apparatus 10 and the like, and transmits the wireless communication setting information and the like. When starting with the induced current of the antenna 158a, the tag IC 158b inputs an interruption signal to the interruption terminal 100b.

An interruption signal is input to the SoC 100a when any one of the following events occurs in the standby state: the infrared-light receiving unit 154 receives an infrared signal of the remote controller 70, the switch of the operation panel 155 is operated, and the NFC tag 158 is read. The SoC 100a only has to be capable of detecting an interruption signal of the interruption terminal 100b in the standby state. The SoC 100a can stop the components related to the other functions and effectively reduce power consumption.

The power-supply control unit 133 controls a power supply state to the SoC 100a and the other units of the projector 100 and controls a shift to the standby state and return from the standby state to the normal operation state. A trigger of the shift from the normal operation state to the standby state is, for example, an input state of image data to the I/F unit 124, operation of the operation panel 155, operation by the remote controller 70, and control data received by the wireless communication unit 156. A trigger of the return from the standby state to the normal operation state is an input of an interruption signal to the interruption terminal 100b as explained above.

In the display system 1, when operation for bringing the terminal apparatus 10 close to the projector main body 101 is performed, the NFC tag communication unit 61 of the terminal apparatus 10 performs reading of the NFC tag 158. At this point, when an induced current flows to the antenna 158a according to a radio signal emitted by the NFC tag communication unit 61, an interruption signal is input to the interruption terminal 100b. Therefore, when the terminal apparatus 10 is brought close to the projector 100 in the standby state, the projector 100 returns from the standby state to the normal operation state.

Consequently, power supply to the wireless communication unit 156 of the projector 100 is started and the wireless communication unit 156 changes to a wirelessly communicable state. Therefore, the projector 100 and the terminal apparatus 10 can establish wireless communication.

That is, even if the projector 100 stops the wireless communication unit 156 in the standby state, when the terminal apparatus 10 reads the NFC tag 158, the projector 100 can establish wireless communication with the terminal apparatus 10. In this case, operation for returning the projector 100 from the standby state to the normal operation state beforehand is not performed. Therefore, it is possible to quickly connect the projector 100 and the terminal apparatus 10 with simple operation and reduce power consumption of the projector 100.

Figures 6A, 6B:
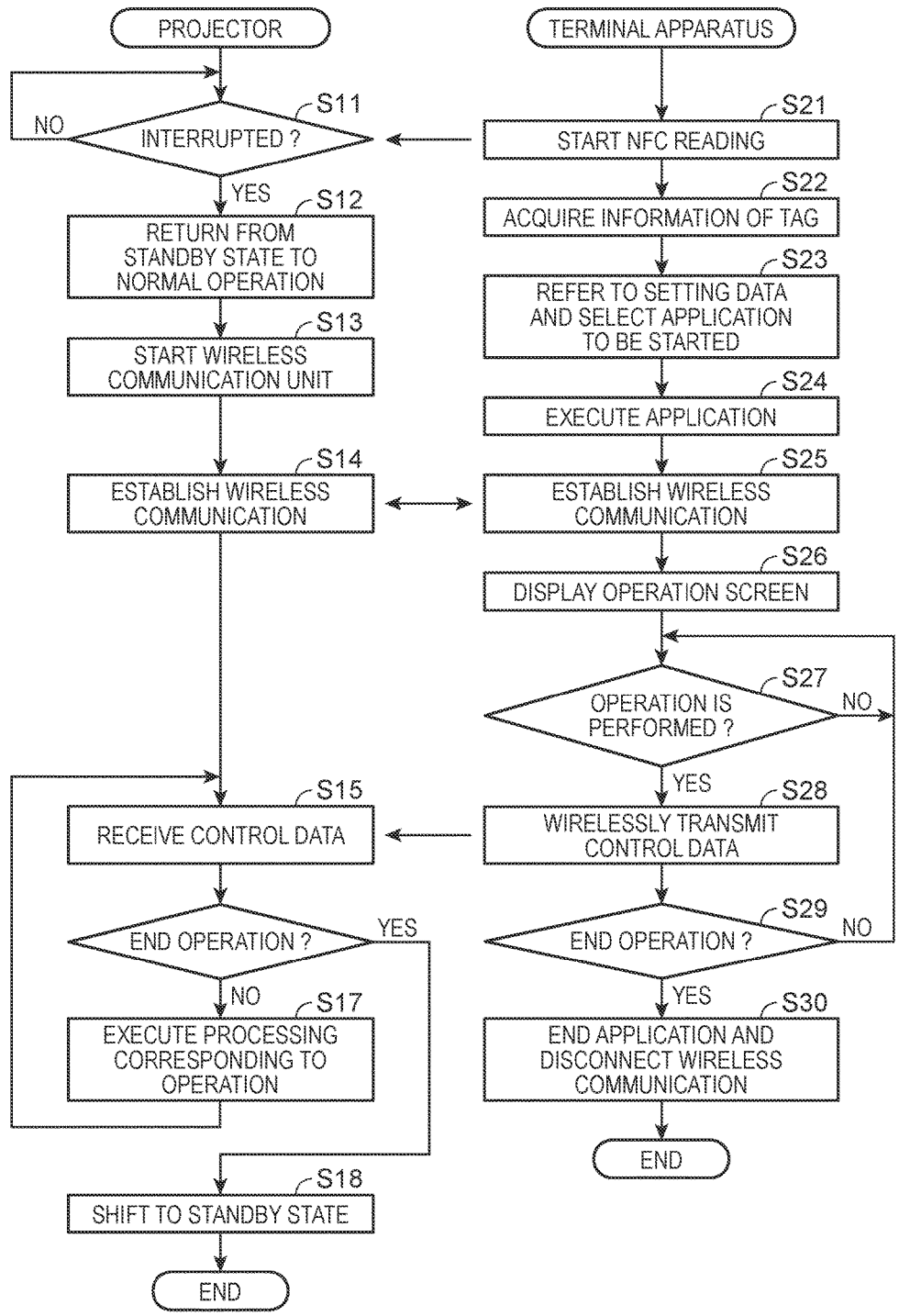
FIG. 6 is a flowchart showing the operations of the projector and the terminal apparatus.

FIG. 6 is a flowchart showing the operation of the display system 1. FIG. 6(A) shows the operation of the projector 100. FIG. 6(B) shows the operation of the terminal apparatus 10.

At a start point in time of the operation shown in FIG. 6, the projector 100 is in the standby state.

The projector 100 stands by for an interruption signal to the interruption terminal 100b (step S11). The projector 100 stops power supply to the units and maintains the standby state until the interruption signal is input (No in step S11).

When the user holds the terminal apparatus 10 in a hand, brings the terminal apparatus 10 close to the upper surface of the projector main body 101, and performs reading of the NFC tag 158 (step S21), the interruption signal is input to the interruption terminal 100b in the projector 100 (Yes in step S11).

The projector 100 returns to the normal operation state in response to the interruption signal (step S12). Consequently, the wireless communication unit 156 starts (step S13).

On the other hand, the terminal apparatus 10 acquires information from the NFC tag 158 with the NFC tag communication unit 61 (step S22). The information acquired in step S22 includes wireless communication setting information. The terminal apparatus 10 selects, on the basis of the acquired information, the application program 31 to be started referring to the NFC setting data 32 (step S23).

In the terminal apparatus 10, when the selected application program 31 is executed (step S24), wireless communication is established on the basis of the wireless communication setting information acquired in step S22 according to the function of the application program 31 (step S25). In the projector 100, the wireless communication unit 156 operates to establish wireless communication with the terminal apparatus 10 (step S14).

The terminal apparatus 10 displays an operation screen according to the function of the application program 31 (step S26) and stands by for operation (No in step S27). The operation screen is a screen on which icons and the like simulating switches for operation are disposed. When the icons and the like are touched, the terminal apparatus 10 detects the operation on the touch screen 53. When detecting the operation (Yes instep S27), the terminal apparatus 10 generates control data corresponding to operation and transmits the control data to the projector 100 with the wireless communication unit 40 (step S28).

The terminal apparatus 10 determines whether the operation detected in step S27 is an instruction for an end of the operation of the application program 31 (step S29). When the operation is not the instruction for the end (No in step S29), the terminal apparatus 10 returns to step S27 and stands by for the next operation. When the operation is the instruction for the end (Yes in step S29), the terminal apparatus 10 ends the execution of the application program 31, disconnects the wireless connection to the projector 100 (step S30), and ends the processing.

The projector 100 receives the control data transmitted by the terminal apparatus 10 (step S15) and determines whether the received control data is data for instructing the end of the operation of the projector 100 by the terminal apparatus (step S16). When the control data is not the data for instructing the end (No in step S16), the projector 100 executes processing corresponding to the control data (step S17), returns to step S15, and stands by for reception of the next control data.

When the control data received from the terminal apparatus 10 is the instruction for the end (Yes in step S16), the projector 100 shifts to the standby state (step S18) and ends the processing.

FIG. 7 is a diagram showing examples of images displayed on the display panel 52 of the terminal apparatus 10. FIG. 7(A) shows an example of an operation screen. FIGS. 7(B) and 7(C) show other examples of the operation screen. FIG. 7(D) shows an example of a display screen in the case in which transmission of the content data 33 is instructed on the operation screen. Operation screens 63, 64, and 65 and a content reproduction screen 66 shown in FIGS. 7(A) to 7(D) are displayed when the application executing unit 23 executes the application program 31.

Figure 7A:
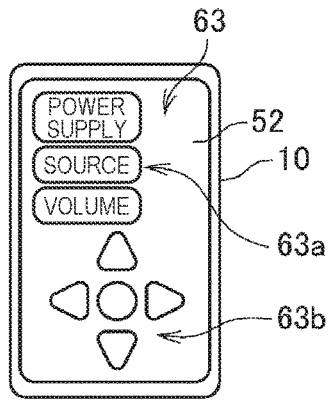
FIG. 7 is a diagram showing examples of images displayed on the display apparatus.

In the operation screen 63 shown in FIG. 7(A), a function icon group 63a is disposed in an upper part of the display panel 52 and a direction indicator icon 63b are disposed in the center of the display panel 52. The function icon group 63a includes icons corresponding to functions such as power-off of the projector 100, switching of an image source projected by the projector 100, and sound volume adjustment. The icon of the power-off corresponds to the instruction for the end of the operation by the application program 31. The direction indicator icon 63b is used for sound volume adjustment, selection of candidates displayed as a list, and the like.

Figure 7B:
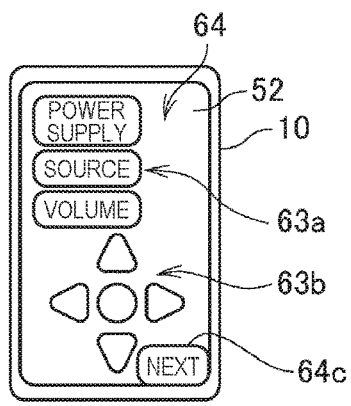
Figure 7C:
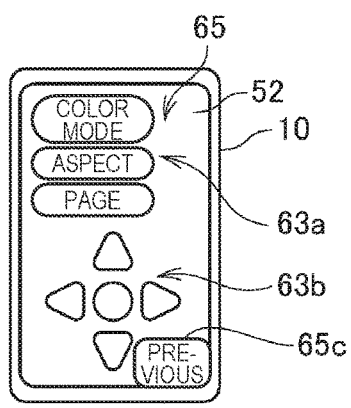

In FIGS. 7(B) and 7(C), examples of operation screens suitable to the operation of the projector 100 having more functions are shown. The operation screen 63 shown in FIG. 7(A) includes the function icon group 63a including three icons and the direction indicator icon 63b. However, when the projector 100 having more functions is operated, the terminal apparatus 10 desirably displays more icons. In such a case, for example, an operation screen 64 shown in FIG. 7(B) is displayed on the terminal apparatus 10.

On the operation screen 64, the icon group 63a and the direction indicator icon 63b same as those displayed on the operation screen 63 are disposed. Further, a page switching icon 64c is disposed on the operation screen 64. When the page switching icon 64c is operated, a display screen transitions to an operation screen 65 shown in FIG. 7(C). On the operation screen 65, the direction indicator icon 63b is disposed. Besides, a function icon group 63d including function icons different from the function icon group 63a is disposed. A page switching icon 65c for instructing transition to the operation screen 64 shown in FIG. 7(B) is disposed.

In this way, the terminal apparatus 10 can enable, according to the function of the application program 31, operation by a large number of icons using the operation screens 64 and 65 configured by pluralities of pages.

The operation screen 63 is suitable to the projector 100 having fewer functions. The operation screens 64 and 65 are suitable to the projector 100 having more functions. Therefore, the terminal apparatus 10 desirably switches and displays the operation screen 63 and the operation screens 64 and 65 according to a model of the projector 100. As a method for realizing the display, in this embodiment, three methods are illustrated.

A first method is the method in which the application program 31 of the terminal apparatus 10 switches and displays a different operation screen according to a model of the projector 100. In this case, the application program 31 determines the model of the projector 100 on the basis of wireless communication setting information acquired by the NFC tag communication unit and selects an operation screen corresponding to the determined model. For example, the application program 31 is capable of displaying the operation screen 63 and the operation screens 64 and 65. The application program 31 selects and displays either one of the operation screens according to the model of the projector 100. In this method, the common application program 31 can be used irrespective of the model of the projector 100. Therefore, there is an advantage that it is easy to manage the application program 31.

A second method is the method in which, as shown in FIG. 3(B), the terminal apparatus 10 stores the plurality of application programs 31 in the storing unit 30 and starts a different application program 31 according to a model of the projector 100. The respective application programs 31 have different operation screens. For example, the application program (1) shown in FIG. 3(B) displays the operation screen 63 and the application program (2) displays the operation screens 64 and 65. In this method, the user only has to install, in the terminal apparatus 10, the application program 31 corresponding to the model of the projector 100 in use. Therefore, there is an advantage that it is possible to reduce a data volume of the application program 31 stored by the storing unit 30.

A third method is the method in which the NFC tag communication unit 61 invokes another application program according to an application program started after reading the NFC tag 158. An application program started first does not have a function of displaying an operation screen, determines a model of the projector 100 on the basis of wireless communication setting information, and invokes another application program corresponding to the determined model. There are a plurality of application programs to be invoked. The application programs can respectively display different operation screens. For example, either one of the application program 31 for displaying the operation screen 63 and the application program 31 for displaying the operation screens 64 and 65 is selected and invoked. In this method, it is possible to easily realize processing for selecting the application program 31 according to the model of the projector 100 even if the processing is complicated. Therefore, there is an advantage that it is possible to easily cope with enhancement, high functionality, and diversification of models of the application program 31.

Figure 7D:
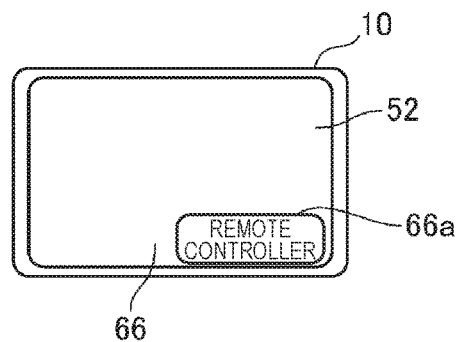

It is possible to transmit the content data 33 stored by the terminal apparatus 10 to the projector 100 according to operation by the operation screens 63, 64, 65, and the like and cause the projector 100 to display the content data 33. An example of a screen during the transmission and the display of the content data 33 is shown in FIG. 7(D). On the content reproduction screen 66, a video or an image being reproduced is displayed on the full screen. Besides, a screen switching icon 66a is disposed to enable operation on the projector 100. When the screen switching icon 66a is operated, the displayed screen is switched to the operation screens 63, 64, 65, and the like. The screen switching icon 66a is desirably displayed at a corner of the display panel 52 not to hinder viewing of the image.

As explained above, the display system 1 according to this embodiment includes the terminal apparatus 10 and the projector 100. The projector 100 includes the projecting unit 110 that displays an image. The projector 100 includes the NFC tag 158, the wireless communication unit 156 that performs wireless communication with the terminal apparatus 10, and the control unit 130 that switches the operation state of the projector 100 to at least the normal operation state and the standby state. When detecting that the NFC tag 158 communicates with the terminal apparatus 10 in the standby state, the control unit 130 shifts the operation state to the normal operation state. The wireless communication unit 156 returns from the standby state to the normal operation state and establishes wireless communication with the terminal apparatus 10. Consequently, when the projector 100 is in the standby state, by performing operation for reading the NFC tag 158, it is possible to quickly start wireless communication between the projector 100 and the terminal apparatus 10. Therefore, it is possible to reduce power consumption of the projector 100 while wireless communication is not established and connect the terminal apparatus 10 and the projector 100 without performing complicated operation.

The NFC tag 158 retains at least wireless communication setting information related to wireless communication of the wireless communication unit 156. The wireless communication unit 156 establishes wireless communication with the terminal apparatus 10 using the wireless communication setting information retained by the NFC tag 158. Therefore, it is possible to quickly establish wireless communication on the basis of the information retained by NFC tag 158.

The NFC tag 158 can store, for example, data (identification information) for identifying a model as a type of the projector 100. Therefore, the terminal apparatus 10 can identify the model of the projector 100. Consequently, the terminal apparatus 10 can perform processing corresponding to the model of the projector 100.

The control unit 130 enables power supply to the wireless communication unit 156 and the projecting unit 110 in the normal operation state and turns off the power supply to the wireless communication unit 156 and the projecting unit 110 and stands by for communication of the NFC tag 158 in the standby state. Therefore, in the standby state, it is possible to enable standby for reading of the NFC tag 158 and reduce power consumption.

The projector 100 includes the infrared-light receiving unit 154 that receives an infrared signal. The control unit 130 enables reception of the infrared signal by the infrared-light receiving unit 154 in the standby state. Therefore, in the standby state, it is possible to stand by for both of reading of the NFC tag 158 and operation of the remote controller 70.

The terminal apparatus 10 includes the NFC tag communication unit 61 that reads the NFC tag 158, the wireless communication unit 40 that performs wireless communication with the projector 100, and the storing unit 30 that stores the application program 31. The terminal apparatus 10 establishes, with the control unit 20, wireless communication with the projector 100 in the wireless communication unit 40 on the basis of information read from the NFC tag 158 by the NFC tag communication unit 61. Further, the control unit 20 reads out, from the storing unit 30, the application program 31 corresponding to the information read from the NFC tag 158 and executes the application program 31 and transmits control data for controlling the projector 100 from the wireless communication unit 40. Consequently, it is possible to establish wireless communication between the projector 100 and the terminal apparatus 10 with simple operation for reading the NFC tag 158 and thereafter operate the projector 100 according to the function of the application program 31.

The terminal apparatus 10 includes the projecting unit 110 that displays a screen and the touch screen 53 and the switch unit 54 that receive operation. The control unit 20 displays, according to the function of the application program 31, with the projecting unit 110, an operation screen for controlling the projector 100 and transmits control data on the basis of operation detected by the operation unit during the display of the operation screen. Consequently, it is possible to operate the projector 100 using, for example, the operation screens 63, 64, and 65 shown in FIGS. 7(A) to 7(C). Therefore, it is possible to operate the projector 100 even if the remote controller 70 exclusive for the projector 100 is not used. The terminal apparatus 10 may be, for example, a smartphone carried by the user. Therefore, it is possible to operate various projectors with the smartphone carried by the user without using the remote controller 70.

The control unit 20 may be capable of executing the plurality of application programs 31 for respectively displaying different operation screens with the projecting unit 110. In this case, the control unit 20 may select, on the basis of information read from the NFC tag 158 by the NFC tag communication unit 61, the application program 31 to be executed. In this case, it is possible to properly use the plurality of kinds of operation screens 63, 64, and 65 according to the plurality of application programs 31.

The control unit 20 maybe capable of displaying a plurality of operation screens according to the function of the application program 31. The control unit 20 may display, on the display panel 52, an operation screen corresponding to information read from the NFC tag 158 by the NFC tag communication unit 61. The control unit 20 may execute an application program when the NFC tag 158 is read by the NFC tag communication unit 61 and invoke and start, according to a function of the application program, the application program 31 for displaying an operation screen.

As explained above, after detecting with an interruption signal that the NFC tag 158 is read, the projector 100 shifts from the standby state to the normal operation state. When a state in which the wireless communication unit 156 does not establish wireless communication with the terminal apparatus 10 continues, the projector 100 may shift to the standby state.

Figure 8:
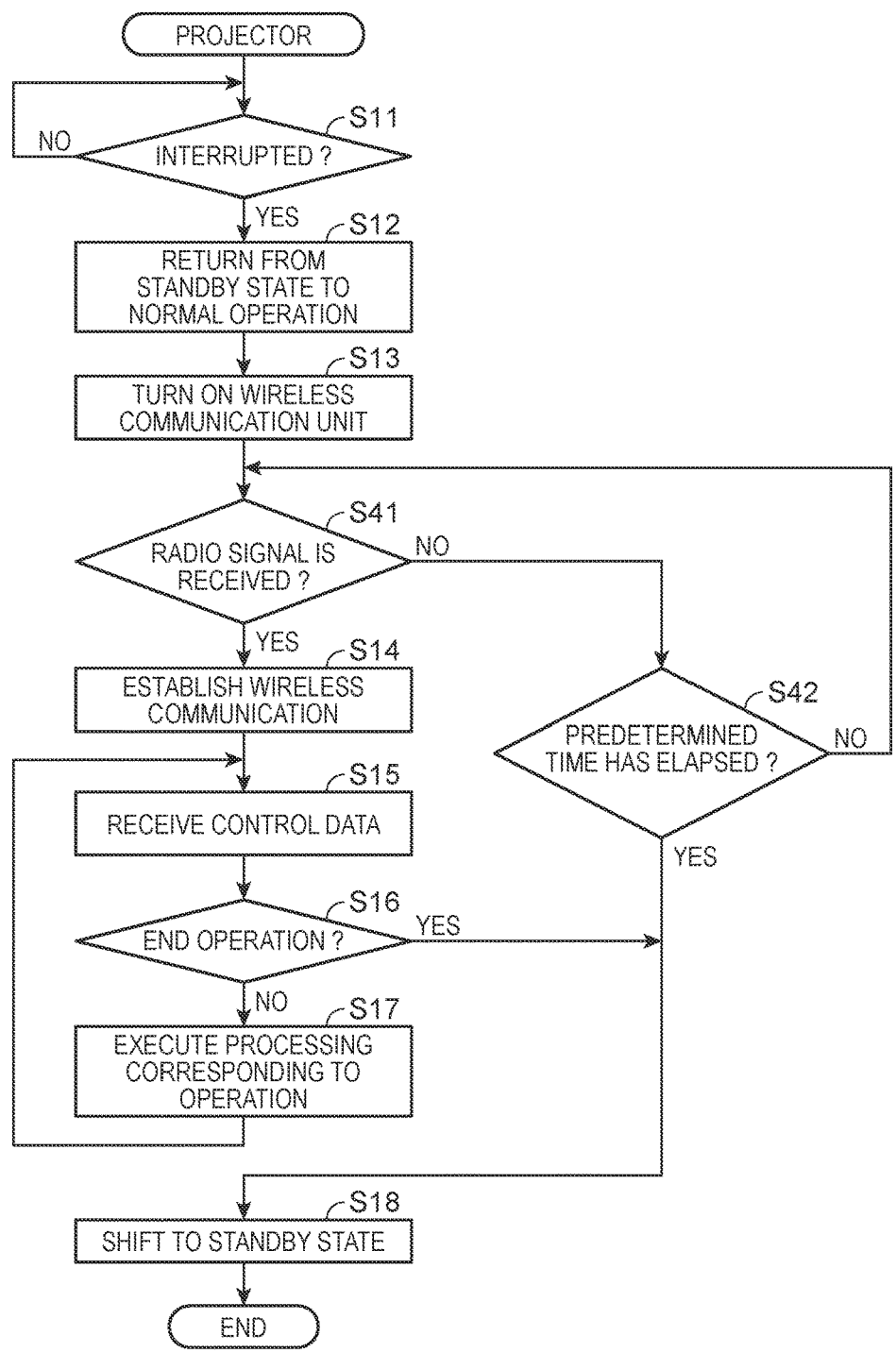
FIG. 8 is a flowchart showing the operation of the projector in a modification.

FIG. 8 is a flowchart showing the operation of the projector 100 in a modification of this embodiment. The operation shown in FIG. 8 can be executed instead of the operation shown in FIG. 6(A). Kinds of processing same as the kinds of processing shown in FIG. 6(A) are denoted by the same step numbers and explanation of the kinds of processing is omitted.

The projector 100 returns to the normal operation state in response to an interruption signal (step S12), starts the wireless communication unit 156 (step S13), and thereafter determines whether a radio signal is received (step S41). In step S41, the projector 100 determines whether the terminal apparatus 10 can receive a radio signal transmitted to establish wireless communication.

When the wireless signal is received (step S41), the projector 100 shifts to step S14 and establishes wireless communication.

On the other hand, when the radio signal is not received (No in step S41), the projector 100 determines whether a time set in advance has elapsed after the wireless communication unit 156 is turned on (step S42). When the set time has not elapsed (No in step S42), the projector 100 returns to step S41. When the time set in advance has elapsed (Yes in step S42), the projector 100 shifts to step S18 and returns to the standby state.

In this operation, even if the projector 100 detects that the NFC tag 158 is read, if wireless communication is not established between the projector 100 and the terminal apparatus 10, the projector 100 returns to the standby state. Therefore, even if the NFC tag 158 is read, it is possible to reduce power consumption in the case in which it is unnecessary to shift to the normal operation state. Specifically, the user erroneously reads the NFC tag 158 and ends the application program 31 or the terminal apparatus 10 not installed with the application program 31 reads the NFC tag 158. In such a case, operation for shifting the projector 100 to the standby state again is unnecessary. Therefore, it is possible to achieve further improvement of convenience.

Note that the embodiment explained above indicates an example of a preferred embodiment of the present invention. Embodiments of the present invention are not limited to this embodiment. Various modified implementations are possible within a range not departing from the spirit of the present invention. For example, the configuration is explained in which one terminal apparatus 10 performs wireless communication with one projector 100 and performs operation. However, a plurality of terminal apparatuses 10 may control one or a plurality of projectors 100. A plurality of projectors 100 maybe controlled by one terminal apparatus 10. Further, the projector 100 may be configured to be capable of identifying the terminal apparatus 10.

For example, in the embodiment explained above, the projector 100 of a front projection type that projects an image from the front of the screen SC is explained as an example of the display apparatus. However, the present invention is not limited to this. For example, a projector of a rear projection type that projects an image from the rear side of the screen SC can be adopted as the display apparatus. A liquid crystal monitor or a liquid crystal television that displays an image on a liquid crystal display panel maybe adopted as the display apparatus. A PDP (Plasma Display Panel), a CRT (Cathode Ray Tube) display, an SED (Surface-conduction Electron-emitter Display), or the like may be used as the display apparatus. A monitor apparatus that displays an image on an organic EL display panel called OLED (Organic light-emitting diode), OEL (Organic Electro Luminescence) display, or the like or a self-emitting display apparatus such as a television receiver may be adopted. When the present invention is applied in configurations including these display apparatuses, as in the embodiment, it is possible to obtain useful effects.

As the terminal apparatus functioning as the input apparatus of the present invention, in this embodiment, the portable terminal apparatus 10 including the flat terminal apparatus main body 11 and held in the hand and operated by the user is explained as the example. However, the present invention is not limited to this. For example, a portable game machine, a portable reproducing apparatus for reproducing music and videos, and the like can be used as the terminal apparatus 10. Further, the terminal apparatus 10 may be configured to include a hardware keyboard or the like other than the display panel 52.

The NFC tag 158 is explained as being set in the projector main body 101. However, the NFC tag 158 maybe set in a housing separate from the projector main body 101. In this case, the separate housing and the projector main body 101 are connected by a cable. Consequently, it is possible to dispose the NFC tag 158 in a position apart from the projector main body. Therefore, convenience of use is higher.

The functional units shown in FIG. 2 and FIG. 4 indicate functional components and specific implementation forms of the functional units are not particularly limited. That is, hardware individually corresponding to the functional units does not always need to be implemented. It is naturally possible that one processor is configured to execute a program to realize functions of a plurality of functional units. A part of the functions realized by software in the embodiment maybe realized by hardware. Alternatively, apart of the functions realized by hardware may be realized by software. Besides, it is also possible to optionally change specific detailed configurations of the other units of the display system 1 in a range not departing from the spirit of the present invention.

REFERENCE SIGNS LIST

1 display system
10 terminal apparatus
20 control unit (terminal control unit)
21 display control unit
22 communication control unit
23 application executing unit
30 storing unit
31 application program
32 NFC setting data
33 content data
40 wireless communication unit (inter-apparatus wireless communication unit)
51 display unit
52 display panel
53 touch screen
54 switch unit
55 operation detecting unit
61 NFC tag communication unit (tag communication unit)
63, 64, 65 operation screen
63*a*, 63*d* function icon group
63*b* direction indicator icon
64*c*, 65*c* page switching icon
66 content reproduction screen
66*a* screen switching icon
70 remote controller
100 projector (display apparatus)
100*a* SoC
100*b* interruption terminal
110 projecting unit (display unit)
130 control unit
131 projection control unit
132 communication control unit
133 power-supply control unit
151 storing unit
153 input processing unit
154 infrared-light receiving unit
154*a* light receiving element
154*b* detection circuit
155 operation panel
155*a* switch board
156 wireless communication unit
158 NFC tag (wireless tag)
158*a* antenna
158*b* tag IC
159 marker
161 wireless communication setting information
SC screen

The invention claimed is:

1. A display apparatus comprising:
a display unit configured to display an image;
a wireless tag;
a wireless communication unit configured to wirelessly communicate with an external terminal apparatus; and
a control unit configured to switch an operation state of the display apparatus to at least a normal operation state and a power saving state, wherein
when detecting that the wireless tag communicates with the terminal apparatus in the power saving state, the control unit shifts the operation state to the normal operation state,
the wireless communication unit returns from the power saving state to the normal operation state and establishes a wireless communication with the terminal apparatus, and
the control unit shifts from the power saving state to the normal operation state, starts the power supply to the wireless communication unit, and, thereafter, when a state in which the wireless communication unit does not establish the wireless communication with the terminal apparatus continues, shifts to the power saving state again.

2. The display apparatus according to claim 1, wherein the wireless tag retains at least wireless communication setting information related to the wireless communication of the wireless communication unit, and
the wireless communication unit establishes the wireless communication with the terminal apparatus using the wireless communication setting information retained by the wireless tag.

3. The display apparatus according to claim 1, wherein the wireless tag is an NFC tag and includes identification information for identifying a type of the display apparatus.

4. The display apparatus according to claim 1, wherein the control unit enables power supply to the wireless communication unit and the display unit in the normal operation state and turns off the power supply to the wireless communication unit and the display unit and stand by for communication of the wireless tag in the power saving state.

5. The display apparatus according to claim 4, wherein the control unit shifts from the power saving state to the normal operation state, starts the power supply to the wireless communication unit, and, thereafter, when a state in which the wireless communication unit does not establish the wireless communication with the terminal apparatus continues, shifts to the power saving state again.

6. The display apparatus according to claim 1, further comprising an infrared communication unit configured to receive an infrared signal, wherein
the control unit enables the reception of the infrared signal by the infrared communication unit in the power saving state.

7. A terminal apparatus comprising:
a tag communication unit configured to read a wireless tag;
an inter-apparatus wireless communication unit configured to wirelessly communicate with an external apparatus;
a storing unit configured to store application programs; and
a terminal control unit configured to establish a wireless communication with the external apparatus through the inter-apparatus wireless communication unit on the basis of information read from the wireless tag by the tag communication unit, select and execute an application program based on the information read from the wireless tag, and transmit, from the inter-apparatus wireless communication unit, control information for controlling the external apparatus.

8. The terminal apparatus according to claim 7, further comprising:
a display unit configured to display a screen; and
an operation unit configured to receive operation, wherein the terminal control unit displays, according to a function of the application program, with the display unit, an operation screen for controlling the external apparatus and transmits the control information on the basis of operation detected by the operation unit during the display of the operation screen.

9. The terminal apparatus according to claim 8, wherein the terminal control unit is capable of executing a plurality of the application programs for displaying, on the display unit, the operation screens different from one another and selects, on the basis of the information read from the wireless tag by the tag communication unit, the application program to be executed.

10. The terminal apparatus according to claim 8, wherein the terminal control unit displays, on the display unit, the operation screen corresponding to the information read from the wireless tag by the tag communication unit among a plurality of the operation screens displayable by the function of the application program.

11. The terminal apparatus according to claim 8, wherein the terminal control unit executes a first application program when the wireless tag is read by the tag communication unit and executes, according to a function of the first application program, a second application program corresponding to the information read from the wireless tag.

12. A display system comprising:
a display apparatus; and
a terminal apparatus, wherein
the display apparatus includes:
a display unit configured to display an image;
a wireless tag;
a wireless communication unit configured to wirelessly communicate with the terminal apparatus; and
a control unit configured to switch an operation state of the display apparatus to at least a normal operation state and a power saving state,
when detecting that the wireless tag communicates with the terminal apparatus in the power saving state, the control unit shifts the operation state to the normal operation state, and the wireless communication unit returns from the power saving state to the normal operation state and establishes a wireless communication with the terminal apparatus, and
the terminal apparatus includes:
a tag communication unit configured to read the wireless tag of the display apparatus;
an inter-apparatus wireless communication unit configured to wirelessly communicate with the display apparatus ;
a storing unit configured to store application programs; and
a terminal control unit configured to establish the wireless communication with the display apparatus through the inter-apparatus wireless communication unit on the basis of information read from the wireless tag by the tag communication unit, read out, from the storing unit, an application program corresponding to the information read from the wireless tag and execute the application program, and transmit, from the inter-apparatus wireless communication unit, control information for controlling the display apparatus,
wherein the control unit shifts from the power saving state to the normal operation state, starts the power supply to the wireless communication unit, and, thereafter, when a state in which the wireless communication unit does not establish the wireless communication with the terminal apparatus continues, shifts to the power saving state again.

* * * * *